United States Patent
Kishine et al.

(10) Patent No.: US 6,635,717 B1
(45) Date of Patent: Oct. 21, 2003

(54) MOLDING MATERIAL

(75) Inventors: Mitsuru Kishine, Settsu (JP); Masanori Kitaichi, Settsu (JP); Tsuyoshi Noguchi, Settsu (JP); Yoshito Tanaka, Settsu (JP); Takayuki Araki, Settsu (JP); Sadashige Irie, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/530,515

(22) PCT Filed: Nov. 5, 1998

(86) PCT No.: PCT/JP98/04977

§ 371 (c)(1),
(2), (4) Date: Jul. 5, 2000

(87) PCT Pub. No.: WO99/24484

PCT Pub. Date: May 20, 1999

(30) Foreign Application Priority Data

Nov. 6, 1997 (JP) .............................. 9-304684
Apr. 30, 1998 (JP) ........................... 10-121308

(51) Int. Cl.$^7$ ............................. C08F 259/00
(52) U.S. Cl. ...................... 525/276; 525/280
(58) Field of Search ................. 525/276, 280

(56) References Cited

U.S. PATENT DOCUMENTS

| | | | |
|---|---|---|---|
| 4,499,249 A | 2/1985 | Nakagawa et al. | |
| 5,049,622 A | 9/1991 | Abe | 525/267 |
| 5,284,920 A | 2/1994 | Carlson | 525/276 |
| 5,605,971 A | * 2/1997 | Arcella et al. | |
| 5,612,419 A | * 3/1997 | Arcella et al. | |

FOREIGN PATENT DOCUMENTS

| | | |
|---|---|---|
| EP | 0 444 700 | 9/1991 |
| EP | 0 683 186 | 11/1995 |
| EP | 0 272 698 | 6/1998 |
| JP | 63-270717 | 11/1988 |
| JP | 6-220143 | 8/1994 |
| JP | 7-316246 | 12/1995 |

OTHER PUBLICATIONS

International Search Report for PCT/JP98/04977, 1–99.
Polymer Preprints, 1997, Apr. ACS, p. 699.
Kobunshi Ronbunshu, col. 49, No. 10, p. 765 (1992).
Polymer Preprints, 1997, Apr., ACS, p. 703.
Office Action from Chinese Patent Office dated May 13, 2002 for Application No. 87118456.
European Office Action for 98 951 691.9 dated Aug. 9, 2001.
Supplementary European Search Report for EP 98951691 dated Mar. 21, 2001.

* cited by examiner

*Primary Examiner*—Jeffrey Mullis
(74) *Attorney, Agent, or Firm*—Sughrue Mion, PLLC

(57) ABSTRACT

According to the present invention, it is possible to provide a molding material, for example, a sealing material for semiconductor-related production apparatuses which comprises a fluorine-containing multi-segment polymer being excellent in mechanical properties (particularly at high temperature), abrasion resistance and transparency and ensuring reduced contamination and reduced gas permeation while maintaining inherent characteristics of a fluorine-containing elastomer such as flexibility, elasticity, sealing property, chemical resistance and heat resistance. A molding material comprising a fluorine-containing multi-segment polymer having an elastomeric fluorine-containing polymer chain segment and a non-elastomeric fluorine-containing polymer chain segment, in which the elastomeric fluorine-containing polymer chain segment imparts flexibility to the whole polymer and has perhaloolefin units as a recurring unit in an amount of not less than 95% by mole.

15 Claims, No Drawings

MOLDING MATERIAL

TECHNICAL FIELD

The present invention relates to a molding material and crosslinkable molding composition which comprise a fluorine-containing multi-segment polymer and used suitably for molding of various molded articles demanded to have a sealing property and cleanliness, and relates to various molded articles produced therefrom by molding, particularly a sealing material and semiconductor-related production apparatuses provided with the sealing material.

BACKGROUND ART

Fluorine-containing elastomers have excellent heat resistance, oil resistance, chemical resistance, etc. and are widely used in various fields, for example, in the fields of electrical and electronic industries, transportation, chemical industries, machinery, foods and metals as molding materials for a sealing material, O-ring, gasket, oil seal, diaphragm, hose, roll, belt, packing and the like.

For example, in the field of production of semiconductors, contamination in a production process is required to be eliminated as much as possible, and there was proposed an attempt to inhibit elution of metal and enhance a strength by adding a fluorine-containing resin fine powder to a fluorine-containing elastomer comprising fluoroolefin and perfluoro (alkyl vinyl ether) (WO97/08239). However since a fluorine-containing resin fine powder is simply kneaded physically, a fluorine-containing resin is released during use, which causes particles as a foreign matter, lowers gas impermeability and results in insufficient cleanliness and sealing property.

Also a fluorine-containing multi-segment polymer prepared by block-copolymerizing an elastomeric fluorine-containing polymer chain segment with a non-elastomeric fluorine-containing polymer chain segment is known.

JP-A-7-316246 discloses various combinations of components (monomers) constituting a fluorine-containing multi-segment polymer. However a concrete example disclosed therein is only a fluorine-containing multi-segment polymer prepared by block-copolymerizing an elastomeric fluorine-containing polymer chain segment comprising vinylidene fluoride (VdF)/hexafluoropropylene (HFP)/tetrafluoroethylene (TFE) with a non-elastomeric fluorine-containing polymer chain segment comprising polyvinylidene fluoride (PVdF).

JP-A-6-220143 discloses various combinations of components (monomers) constituting a fluorine-containing multi-segment polymer. However concrete examples disclosed therein are only combinations of TFE/propylene, TFE/propylene/VdF and TFE/hydrocarbon type olefin of C2 or C3/perfluoro(alkyl vinyl ether) (PAVE) as an elastomeric fluorine-containing polymer chain segment and PTFE, TFE/ethylene and TFE/PAVE as a non-elastomeric fluorine-containing polymer chain segment.

However those fluorine-containing multi-segment polymers are low in a blocking ratio and contain many polymer molecules comprising only elastomeric fluorine-containing polymer chain segment, to which a non-elastomeric component is not bonded. Therefore in various molded articles produced by molding them, elution of elastomeric fluorine-containing polymer chain segment and other low molecular weight substances occurs and thus heat resistance, chemical resistance and mechanical properties are insufficient. Particularly in case of use as a sealing material for semiconductor device production apparatuses, in which cleanliness is demanded, there arises a problem with elution of elastomeric fluorine-containing polymer chain segment and other low molecular weight substances due to a low blocking ratio. Also the polymer itself is colored milky white, and transparency which is a characteristic of a fluorine-containing multi-segment polymer is deteriorated.

An object of the present invention is to provide the material for molding, i.e. the molding material and crosslinkable molding composition which comprise a fluorine-containing multi-segment polymer having an elastomeric fluorine-containing polymer chain segment and a non-elastomeric fluorine-containing polymer chain segment, particularly a sealing material for semiconductor-related production apparatuses which is produced by molding the molding material and crosslinkable molding composition and ensures less elution of elastomeric fluorine-containing polymer chain segment and other low molecular weight substances, and semiconductor production apparatuses provided with the sealing material.

DISCLOSURE OF INVENTION

The present invention relates to the molding material comprising a fluorine-containing multi-segment polymer having an elastomeric fluorine-containing polymer chain segment (hereinafter referred to as "elastomeric segment A") and a non-elastomeric fluorine-containing polymer chain segment (hereinafter referred to as "non-elastomeric segment B"), in which the elastomeric segment A imparts flexibility to the whole polymer and has perhaloolefin units as a recurring unit.

The molding material of the present invention contains perhaloolefin units as a recurring unit of the elastomeric segment A in an amount of not less than 90% by mole, preferably not less than 95% by mole.

In the present invention, the elastomeric segment A and/or the non-elastomeric segment B may contain recurring units derived from monomer giving a curing site to the respective segments in an amount of not more than 5% by mole based on each segment.

Also it is preferable that the elastomeric segment A is a non-crystalline segment and its glass transition temperature is not more than 25° C. and further that the segment A comprises tetrafluoroethylene (TFE)/perfluoro(alkyl vinyl ether) (PAVE)/monomer giving a curing site in an amount of 45 to 90/10 to 50/0 to 5% by mole.

It is preferable that the non-elastomeric segment B is a polymer chain having a crystalline melting point of not less than 150° C. and has perhaloolefin units as a recurring unit. Further it is preferable that the non-elastomeric segment B is a non-elastomeric segment comprising 85 to 100% by mole of TFE and 0 to 15% by mole of $CF_2=CF-R_f^1$, in which $R_f^1$ is $CF_3$ or $OR_f^2$ ($R_f^2$ is a perfluoroalkyl group having 1 to 5 carbon atoms).

The non-elastomeric segment B has at least one fluoroolefin unit and can be used preferably even if it has a haloolefin unit having hydrogen atom as a recurring unit as case demands.

In the molding material of the present invention, it is preferable that the fluorine-containing multi-segment polymer (for example, B-A-B, A-B, etc.) does not contain a polymer molecule C consisting of the elastomeric segment A which is not bonded to the non-elastomeric segment B or even if such a polymer molecule C is contained, its amount is not more than 35% by weight, particularly not more than 10% by weight, in other words, A/(A+C)≧65% by weight, particularly A/(A+C)≧90% by weight.

The present invention also relates to the crosslinkable molding composition comprising 100 parts by weight (hereinafter referred to as "part") of the above-mentioned fluorine-containing multi-segment polymer having a curing site, 0.05 to 10 parts of an organic peroxide and 10 to 010 parts of a crosslinking aid.

Also the present invention relates to the crosslinkable molding composition comprising 100 parts of the above-mentioned fluorine-containing multi-segment polymer having a nitrile group as a curing site and 0.1 to 10 parts of a crosslinking agent having a functional group capable of reacting with the nitrile group.

The molding material and crosslinkable molding composition of the present invention can be used for various molded articles, and since contamination is hardly caused, they are particularly suitable as a sealing material for various production apparatuses in the semiconductor-related field.

Also it is preferable that the above-mentioned fluorine-containing multi-segment polymer is used as a sealing material after subjected to crosslinking by high energy rays.

Down-sizing of such a sealing material has advanced more and more and cleanliness thereof is demanded. Concretely a sealing material is built in semi-conductor production apparatuses, for example, etching system, cleaning equipment, exposure system, polishing device, deposition system and diffusion/ion-implantation system.

BEST MODE FOR CARRYING OUT THE INVENTION

The molding material of the present invention comprises the fluorine-containing multi-segment polymer which is a block copolymer of the elastomeric segment A and the non-elastomeric segment B and has flexibility, in which the elastomeric segment A has perhaloolefin units as a recurring unit.

The present inventors have found that in the process for preparing a fluorine-containing multi-segment polymer which was referred to in JP-B-58-4728, etc., and disclosed in Kobunshi Ronbunshu (Vol. 49, No. 10, 1992), namely a so-called iodine transfer polymerization process, when not less than 90% by mole, particularly not less than 95% by mole of perhaloolefin units are contained as a recurring unit in the elastomeric segment A, a block copolymerization reaction with monomer for the non-elastomeric segment B advances regularly and uniformly and it is possible to largely decrease an amount of unintended products such as un-reacted elastomeric segment A and the non-elastomeric segment B having a low molecular weight even if a reaction occurs, and further that molded articles produced therefrom are useful as a sealing material for semiconductor-related production apparatuses. On the other hand, molding materials comprising a fluorine-containing multi-segment polymer containing unintended un-reacted elastomeric segment A, etc. have adverse effect on molded articles produced therefrom, such as lowering of mechanical strength, heat resistance, chemical resistance and cleanliness due to elution of impurities.

Examples of the usable perhaloolefin as a recurring unit of he elastomeric segment A are, for instance, TFE, chlorotrifluoroethylene (CTFE), perfluorovinylethers such as perfluoro(alkyl vinyl ether) (alkyl group has 1 to 5 carbon atoms) and

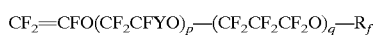

wherein Y is F or $CF_3$, $R_f$ is a perfluoroalkyl group having 1 to 5 carbon atoms, p is 0 or an integer of 1 to 5, q is 0 or an integer of 1 to 5, provided that p+q≧1, hexafluoropropylene (HFP), and the like. Among them, those having a combination and composition giving elastomeric property can be used. Further a monomer giving a curing site for peroxide crosslinking, polyol crosslinking, polyamine crosslinking and crosslinking by employing a compound such as bisaminophenol as a crosslinking agent may be introduced in an amount of not more than 5% by mole, preferably not more than 2% by mole, more preferably not more than 1% by mole, and thereby the segment A exhibits better compression set.

In the fluorine-containing multi-segment polymer used in the present invention, the elastomeric segment A is a segment being non-crystalline and having a glass transition temperature of not more than 25° C. Examples of preferable composition thereof are, for instance, TFE/PAVE/monomer giving a curing site (45 to 90/10 to 50/0 to 5 in % by mole, hereinafter the same), more preferably 45 to 80/20 to 50/0 to 5, particularly 53 to 70/30 to 45/0 to 2.

Examples of the monomer giving a curing site are, for instance, vinylidene fluoride, iodine-containing monomers represented by $CX_2=CX-CX-R_f^3CHRI$, in which X is H, F or $CH_3$, $R_f^3$ is a fluoroalkylene group, perfluoroalkylene group, fluoropolyoxyalkylene group or perfluoropolyoxyalkylene group, R is H or $CH_3$, nitrile-containing monomers represented by

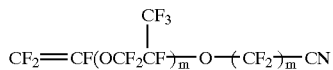

in which m is 0 or an integer of 1 to 5, n is an integer of 1 to 3,

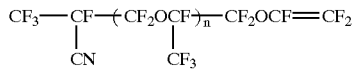

in which n is 0 or an integer of 1 to 4,

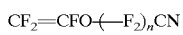

in which n is an integer of 1 to 4,

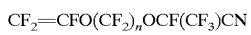

in which n is an integer of 2 to 5,

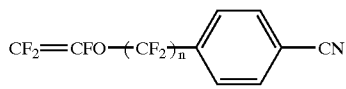

in which n is an integer of 1 to 6,

in which n is 1 or 2, or

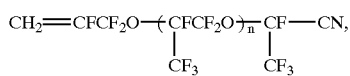

bromine-containing monomers, and the like. Usually iodine-containing monomers and nitrile-containing monomers are suitable.

As the iodine-containing monomer, a perfluoro(vinyl ether) compound is suitable from the viewpoint of copolymerizability. For example, perfluoro(6,6-dihydro-6-iodo-3-oxa-1-hexene) and perfluoro(5-iodo-3-oxa-1-pentene) are suitable.

In addition, there is fluorovinylether disclosed in JP-B-5-63482 and represented by the formula:

in which Y is a trifluoromethyl group, n is 0, 1 or 2.

Further there can be used olefin iodide disclosed in JP-A-7-316246 and represented by the formula:

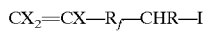

in which X is hydrogen atom, fluorine atom or methyl, R is hydrogen or methyl, $R_f$ is a linear or branched fluoro- or perfluoro-alkylene group or fluoro- or perfluoro-oxyalkylene group which may have at least one ether type oxygen atom. In addition, $CF_2$=CHI can also be used suitably.

When vulcanization (crosslinking) is carried out by using high energy rays such as radiation ($\alpha$-, $\beta$-, $\gamma$- or X-rays), electron beams and ultraviolet rays, it is not always necessary to introduce monomer for giving a curing site. In crosslinking with high energy rays, since no crosslinking agent such as an organic peroxide is required and thus no step for kneading a crosslinking agent is necessary, it is possible to not only simplify a preparation step but also avoid contamination in a kneading step. Thus crosslinking with high energy rays is suitable particularly for production of various molded articles used for production of semiconductors and required to be highly free from contamination. However in an application where a sealing property at high temperature is demanded, it is advantageous from the viewpoint of physical properties to introduce a curing site and crosslink by using an organic peroxide and crosslinking aid or a crosslinking agent such as bisaminophenol having a functional group reactable with a nitrile group.

The elastomeric segment A can be prepared by iodine transfer polymerization method known as a process for preparing a fluorine-containing elastomer (JP-B-58-4728, JP-A-62-12734).

For example, there is a method of carrying out emulsion polymerization with stirring the above-mentioned perhaloolefin and if necessary, monomer giving a curing site under pressure in water medium substantially under oxygen-free condition in the presence of an iodine compound, preferably a diiodine compound and a radical polymerization initiator.

Represented examples of diiodine compound to be used are, for instance, 1-3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. Those compounds can be used alone or in combination of two or more thereof. Among them, 1,4-diiodoperfluorobutane is preferred. An amount of the diiodine compound is from 0.01 to 5% by weight on the basis of a total weight of monomers constituting the elastomeric segment A.

When a polymerization temperature exceeds 60° C., characteristics under normal condition seem not affected particularly, but compression set tends to be lowered. When less than 40° C., in case of single use of persulfate, polymerization speed is low. Also even if a persulfate-added redox type initiator is used, polymerization speed is low and besides a metal ion of a reducing agent remains in the polymer, which makes it impossible to use in application for production of semiconductors.

A radical polymerization initiator which is used for preparing the elastomeric segment A of the present invention may be the same as that which has been used for polymerization of a fluorine-containing elastomer. Examples thereof are organic and inorganic peroxides and azo-compounds. Represented examples of the initiator are persulfates, carbonate peroxides, peroxide esters, and the like. Preferred initiator is ammonium persulfate (APS). APS can be used solely or in combination with a reducing agent such as sulfites. However in many cases since an obtained elastomer is used as a sealing material for semiconductor production apparatuses, etc. in which a high cleanliness is demanded, it is preferable not to use a reducing agent as a source for generating metal ions if possible.

Though a wide range of emulsifying agents can be used for emulsion polymerization, from a point of inhibiting a chain transfer reaction with molecules of the emulsifying agent which occurs during the polymerization, carboxylic acid salts having a fluorocarbon chain or fluoropolyether chain are desirable. An amount of the emulsifying agent is desirably from about 0.05% by weight to 2% by weight, particularly desirably from 0.2 to 1.5% by weight based on added water.

Since the monomer mixture gas used in the present invention is explosive as described in Advances in Chemistry Series, G. H. Kalb et al, 129, 13 (1973), it is necessary to take measures for a polymerization equipment not to cause a sparking. From that point of view, it is preferable that a polymerization pressure is as low as possible.

The polymerization pressure can be changed in a wide range, generally from 0.5 to 5 MPa. The higher the polymerization pressure is, the more a polymerization speed increases. Therefore the polymerization pressure is desirably not less than 0.8 MPa from the viewpoint of increasing productivity.

It is preferable that a number average molecular weight of the so-obtained elastomeric segment A is from 5,000 to 750,000, particularly from 20,000 to 400,000 from the viewpoint of imparting flexibility, elasticity and mechanical properties to the whole fluorine-containing multi-segment polymer obtained and also from the viewpoint of moldability.

In the present invention, an end of the elastomeric segment A is of perhalo type and has an iodine atom which becomes a starting point of block copolymerization of the non-elastomeric segment.

In the present invention, the non-elastomeric segment B is basically not limited if it has a fluorine atom and does not have the above-mentioned elastomeric property. The non-elastomeric segment B may be selected according to characteristics and functions which are intended to be obtained by block-copolymerizing the non-elastomeric segment B. A cystalline polymer chain segment having a crystalline melting point of not less than 150° C. is preferred to impart mechanical properties.

Among monomers constituting the non-elastomeric segment B, examples of a fluorine-containing monomer are, for instance, one or two or more of perhaloolefins such as TFE, CTFE, PAVE, HFP, $CF_2$=CF$(CF_2)_p$X in which p is an integer of 1 to 10, X is F or Cl, and perfluoro-2-butene; and partly fluorinated olefins such as vinylidene fluoride, vinyl fluoride, trifluoroethylene,

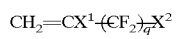

in which $X^1$ and $X^2$ are H or F, q is an integer of 1 to 10, and $CH_2$=C$(CF_3)_2$. Also one or two or more of monomers copolymerizable therewith, for example, ethylene, propylene, vinyl chloride, vinyl ethers, vinyl esters of carboxylic acid and acryls can be used as copolymerizable components.

Among them, examples of preferred monomer used as a main component are a single use of fluorine-containing olefin, a combination of fluorine-containing olefins, a combination of ethylene and TFE and a combination of ethylene and CTFE from the viewpoint of chemical resistance and heat resistance. Particularly a single use of perhaloolefin and a combination of perhaloolefins are preferred.

Examples thereof are (1) VdF/TFE (0 to 100/100 to 0), particularly VdF/TFE (70 to 99/30 to 1), PTFE or PVdF;

(2) ethylene/TFE/HFP (6 to 60/40 to 81/1 to 30), 3,3,3-trifluoropropylene-1,2-trifluoromethyl-3,3,3-trifluoropropylene-1/PAVE (40 to 60/60 to 40);

(3) TFE/$CF_2$=CF—$R_f^1$ (amount exhibiting non-elastomeric property, namely not more than 15% by mole of $CF_2$=CF—$R_f^1$);

(4) VdF/TFE/CTFE (50 to 99/30 to 0/20 to 1);

(5) VdF/TFE/HFP (60 to 99/30 to 0/10 to 1);

(6) ethylene/TFE (30 to 60/70 to 40);

(7) polychlorotrifluoroethylene (PCTFE);

(8) ethylene/CTFE (30 to 60/70 to 40);

and the like. Among them, particularly preferred from the viewpoint of chemical resistance and heat resistance are non-elastomeric copolymers such as PTFE and TFE/$CF_2$=CF—$R_f^1$.

As a monomer constituting the non-elastomeric segment B, the above-mentioned monomer giving a curing site for various vulcanizations may be introduced in an amount of not more than 5% by mole, preferably not more than 2% by mole, more preferably not more than 1% by mole.

Block copolymerization of the non-elastomeric segment B can be carried out subsequently to the emulsion polymerization of the elastomeric segment A by changing a monomer to one for the non-elastomeric segment B.

A number average molecular weight of the non-elastomeric segment B can be adjusted in a wide range of from 1,000 to 1,200,000, preferably from 3,000 to 400,000.

An important feature of the present invention is that the non-elastomeric segment B can be securely block-copolymerized with the elastomeric segment A and that a molecular weight (degree of polymerization) of the non-elastomeric segment B can be increased. As mentioned above, this can be achieved by making the elastomeric segment A have perhaloolefin units of not less than 90% by mole, particularly not less than 95% by mole as a recurring unit.

The thus obtained fluorine-containing multi-segment polymer mainly comprises polymer molecules (B-A-B) in which the non-elastomeric segments B are bonded to both sides of the elastomeric segment A and polymer molecules (A-B) in which the non-elastomeric segment B is bonded to one side of the elastomeric segment A. An amount of polymer molecules (C) which comprises only the elastomeric segment A without being bonded to the non-elastomeric segment B is not more than 35% by weight, particularly not more than 10% by weight based on a total amount of the segment A and polymer (C) in the fluorine-containing multi-segment polymer. Elution of the polymer molecule (C) is caused by, for example, a fluorine-containing organic solvent even after vulcanization, which causes not only deterioration of quality of molded article but also contamination. Therefore an amount thereof is preferably as small as possible, desirably not more than 5% by weight, particularly zero substantially.

In the present invention, a proportion of the elastomeric segment A to the non-elastomeric segment B in the fluorine-containing multi-segment polymer may be selected in the above-mentioned range of molecular weight. The proportion A/B in weight ratio is, for example, to 99/90 to 1, particularly preferably 60 to 95/40 to 5.

The process for preparing the fluorine-containing multi-segment polymer of the present invention as a block polymer is as explained above. Also a graft polymer prepared through a preparation process disclosed in JP-A-62-34324 can be used.

The molding material of the present invention comprises the above-mentioned fluorine-containing multi-segment polymer, and known additives can be used optionally depending on application, crosslinking method and required physical properties (mechanical properties, electrical properties, appearance).

Also when crosslinking points are provided by introducing curing sites into the the elastomeric segment A and/or the non-elastomeric segment B, vulcanization (crosslinking) can be carried out by peroxide vulcanization with known organic peroxides, polyol vulcanization with known polyols, polyamine vulcanization with known polyamine compounds, triazine vulcanization with known organotin catalysts or vulcanization with a crosslinking agent having a functional group reactable with a nitrile group.

In case of peroxide vulcanization, it is preferable to use a crosslinkable molding composition comprising the above-mentioned fluorine-containing multi-segment polymer having a curing site, organic peroxide and crosslinking aid.

Organic peroxide to be used may be any of known organic peroxides which generate peroxy radicals under vulcanization temperature condition. Examples of the preferred organic peroxide are di-t-butyl peroxide, dicumyl peroxide, 2,5-dimethyl-2,5-di(benzoylperoxy) hexane, 2,5-dimethyl-2,5-di(t-butylperoxy) hexane, 1,1-bis(t-butylperoxy)-3,5,5-trimethylcyclohexane, 2,5-dimethylhexane-2,5-dihydroxy peroxide, t-butylcumyl peroxide, α,α'-bis(t-butylperoxy)-p-diisopropylbenzene, 2,5-dimethyl-2,5-di(t-butylperoxy) hexyne-3, benzoyl peroxide, t-butylperoxybenzene, t-butylperoxy maleate, t-butylperoxyisopropyl carbonate, and the like.

A content of the organic peroxide is usually from 0.05 to 10 parts, preferably from 1 to 5 parts on the basis of 100 parts of fluorine-containing multi-segment polymer.

When the content of organic peroxide is less than 0.05 part, the fluorine-containing multi-segment polymer is not crosslinked sufficiently. On the contrary, when more than 10 parts, physical properties of a vulcanizate are lowered.

In such peroxide vulcanization, a crosslinking aid such as a polyfunctional co-crosslinking agent can be used. The usable polyfunctional co-crosslinking agents are those used together with an organic peroxide in peroxide vulcanization of a fluorine-containing elastomer. Examples thereof are, for instance, bisolefins represented by triallyl cyanurate, trimethallyl isocyanurate, triallyl isocyanurate, triallyl formal, triallyl phosphate, triallyl trimellitate, N,N'-m-phenylenebismaleimide, dipropargyl terephthalate, diallyl phthalate, tetraallyl terephthalamide, tris(diallylamine)-S-triazine, triallyl phosphite, N,N-diallylacrylamide and 1,6-divinyldodecafluorohexane.

Also there are a fluorine-containing triallyl isocyanurate which is obtained by replacing a part of hydrogen atoms in three allyl groups of triallyl isocyanurate with fluorine atoms having higher heat resistance, and the like (cf. U.S. Pat. No. 4,320,216, WO98/00407, Klenovic h, S. V. et al, Zh. Prikl, Khim. (Leningrad) (1987, 60(3), 656–8)).

A content of a crosslinking aid is usually from 0.1 to 10 parts, preferably from 0.5 to 5 parts on the basis of 100 parts of fluorine-containing multi-segment polymer.

When the content of the crosslinking aid is less than 0.1 part, the fluorine-containing multi-segment polymer is not vulcanized sufficiently. On the contrary, when more than 10 parts, elongation of a vulcanizate is lowered.

When vulcanizing a fluorine-containing multi-segment polymer having a nitrile group as a curing site, it is preferable to use a crosslinkable molding composition comprising a fluorine-containing multi-segment polymer having a nitrile group and a crosslinking agent having a functional group such as bisaminophenol reactable with the nitrile group.

Examples of the crosslinking agent having a functional group reactable with a nitrile group are known bisaminophenol compounds, tetraamine compounds, bisaminothiophenol compounds, bisamidrazone compounds, bisamidoxime compounds (cf. JP-A-59-109546, JP-A-8-120144, JP-A-8-104789, JP-A-8-119926, JP-A-8-217742, JP-A-9-31283, JP-A-9-31284), and the like.

In the molding material and crosslinkable molding composition of the present invention, particularly in the fields where high purity and freedom from contamination are not demanded, usual additives which are added to a fluorine-containing elastomer composition can be blended as case demand, for example, a filler, processing aid, plasticizer, coloring agent, and the like. At least one usual vulcanizing agent or vulcanizing accelerator which differs from those mentioned above may be added. Also a known fluorine-containing rubber may be mixed in the range not lowering an effect of the present invention.

The molding material and crosslinkable molding composition of the present invention can be prepared by mixing each of the above-mentioned components by using conventional rubber processing machine, for example, open roll, banbury mixer, kneader, etc. and besides, can be prepared by a method using a closed mixer and a coagulation method through emulsion mixing.

In order to obtain a pre-molded article from the above-mentioned molding material and crosslinkable molding composition, a usual method may be employed. There can be employed known methods such as a method of heating and compressing in a die, a method of feeding under pressure in a heated die and a method of extruding. In case of extruded products such as hose and wire, since they can maintain their forms after extrusion, pre-molded articles obtained by extrusion without using a crosslinking agent can be used as they are. Of course it is possible to use pre-molded articles subjected to crosslinking by heating with steam by using a crosslinking agent. Also in case of molded articles such as O-ring which are difficult to maintain shapes thereof after releasing when not subjected to crosslinking, it is possible to use a pre-molded article previously subjected to crosslinking by using a crosslinking agent.

In the present invention, peroxide vulcanization can be carried out under conventional vulcanization conditions of a fluorine-containing rubber. For example, a vulcanized rubber can be obtained by putting in a metal die, press-vulcanizing by holding under pressure at 120° to 200° C. for 1 to 60 minutes and then vulcanizing in an oven by holding at 120° to 320° C. for 0 to 48 hours.

In the present invention, vulcanization with a crosslinking agent such as bisaminophenol can be carried out under conventional vulcanization conditions of a fluorine-containing rubber. For example, a vulcanized rubber can be obtained by putting in a metal die, press-vulcanizing by holding under pressure at 120° to 200° C. for 1 to 60 minutes and then vulcanizing in an oven by holding at 120° to 320° C. for 0 to 48 hours.

In case of applications such as semiconductor-related production apparatuses where freedom from contamination is strongly demanded, it is preferable to carry out crosslinking with high energy rays without adding a crosslinking agent. Examples of such rays are radiation such as α-ray, β-ray, γ-ray and X-ray, electron beams and ultraviolet rays.

With respect to high energy rays emitted to a pre-molded article, for example, in case of electron beams, an amount of emitting rays is preferably from 5 to 500 kGy, more preferably from 10 to 300 kGy. When less than 5 kGy, improvement in mechanical strength by emitting radiation is insufficient, and when more than 500 kGy, degradation of polymer advances and bonding between molecules is partly cut, which results in lowering of mechanical strength of a molded article. Also in order to improve mechanical strength, emission is preferably not less than 500 kGy/hr, more preferably not less than 1,000 kGy/hr.

In case of use as a molding material for various molded articles for semiconductor production apparatuses, for example, a sealing material, characteristics for resisting under strict conditions against strong acids such as hydrofluoric acid, ammonium fluoride, hydrochloric acid and sulfuric acid; alkalis such as ammonia, sodium hydroxide and amines; various plasmas such as oxygen, neon and $CF_4$; and the like are demanded. In order to meet such demand, the molding material of the present invention comprising the following components may be used.

(1) Fluorine-containing Multi-segment Polymer (1-a) Elastomeric Segment A

Copolymer comprising 45 to 90% by mole of tetrafluoroethylene, 10 to 50% by mole of perfluoro(alkyl vinyl ether) and 0 to 5% by mole of monomer giving a curing site and having iodine atom Molecular weight: 20,000 to 400,000

(1-b) Non-elastomeric Segment B

Preferred are tetrafluoroethylene homopolymer, a copolymer comprising 90 to 99.99% by mole of tetrafluoroethylene and 0.01 to 10% by mole of perfluoro(alkyl vinyl ether), a copolymer comprising 85 to 99.99% by mole of tetrafluoroethylene and 0.01 to 15% by mole of hexafluoropropylene, and the like.

Molecular weight: 1,000 to 400,000

(2) Additive

Basically it is preferable not to use additives. Only in necessary cases for reinforcement and lowering of electrostatic charge depending on purpose and parts, a smaller amount of carbon black, titanium oxide, silicon oxide, fluorine-containing resin powder, etc. may be added.

(3) Vulcanizing Method

Though sufficient strength can be obtained even if vulcanization is not carried out, when enhancing mechanical properties by vulcanization, known vulcanization method can be employed. However if possible, a vulcanization method without using metal, metal compound and metal ion is preferred. Concretely preferred are peroxide vulcanization, bisaminophenol vulcanization and vulcanization with high energy ray such as radiation, electron beam or ultraviolet ray.

(4) Molding Method

Known injection molding, extrusion molding and compression molding can be applied.

The fluorine-containing multi-segment polymer of the present invention is excellent in properties as an elastomer such as flexibility, elasticity and sealing property and in properties as a crystalline resin such as mechanical strength, abrasion resistance and heat resistance. Further since the both segments are chemically bonded to each other, the polymer is excellent in cleanliness and transparency.

The molding material and composition of the present invention are useful as materials for various molded articles in the fields shown in Tables 1 to 3 making the best use of the above-mentioned characteristics.

TABLE 1

| Fields of industry | Final product | Application | Parts |
|---|---|---|---|
| Electrical Semiconductor | Semiconductor production apparatus Liquid crystal panel production apparatus Plasma panel production apparatus | CVD device Dry etching device Wet etching device Oxidation/diffusion device Sputtering device Ashing device Cleaning device Ion implantation device | O-ring (square), packing, sealing material, tube, roll, coating, lining, gasket, diaphragm, hose |
| Transportation means Automobile | Automobile | Engine and peripheral parts | Gasket, shaft seal, valve stem seat, sealing material, hose |
| | | AT device | Hose, sealing material |
| | | Fuel line and peripheral parts | O-ring (square), tube, packing, core material of valve, hose, sealing material, diaphragm |
| Aircraft | Aircraft | Fuel line | Diaphragm, O-ring (square) valve tube packing; hose, sealing material |
| Rocket | Rocket | Fuel line | same as above |
| Ship | Ship | Fuel line | same as above |
| Chemical Chemicals | Plant | Processes for producing chemicals such as pharmaceutical, agricultural chemical, paint and resin, (Petroleum) | Lining, valve, packing, roll, hose, diaphragm, O-ring (square), tube, sealing material |
| Pharmaceutical | Medicines | Plug for chemicals | Plug for chemicals |
| Machinery | Developer | Film developing machine | Roll |
| Photograph | | X-ray film developing machine | Roll |
| Printing | Printing machine | Printing roll | Roll |
| Painting | Painting facilities | Coating roll | Roll |
| Physical and chemical appliances for analysis | | | Tube |
| Foods Plant | | Foods processing process | Lining, valve, packing, roll, hose, diaphragm, O-ring (square), tube, sealing material |
| Metal Steel making | Steel plate processing facilities | Steel plate processing roll | Roll |

TABLE 2

| Field of industry | Needed characteristics |
|---|---|
| Electrical | Plasma resistance, acid resistance, alkali resistance, amine resistance, ozone resistance, gas resistance, chemical resistance, cleanliness, heat resistance |
| Transportation means | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Machinery | Chemical resistance |
| | Chemical resistance |
| | Solvent resistance |
| | Solvent resistance |
| Foods | Chemical resistance, solvent resistance, heat resistance |
| Metal | Heat resistance, acid resistance |

TABLE 3

| Field of industry | Parts |
|---|---|
| Electrical | O-ring and sealing material for gate valve of corresponding product |
| | O-ring and sealing material for quartz window of corresponding product |
| | O-ring and sealing material for chamber of corresponding product |
| | O-ring and sealing material for gate of corresponding product |
| | O-ring and sealing material for bell jar of corresponding product |
| | O-ring and sealing material for coupling of corresponding product |
| | O-ring and sealing material for pump of corresponding product |
| | O-ring and sealing material for gas control device for semiconductor of corresponding product |
| | O-ring and sealing material for resist developing solution and peeling solution |
| | O-ring and sealing material for wafer cleaning solution |
| | Diaphragm for pump of corresponding product |
| | Hose for resist developing solution and peeling solution |
| | Hose and tube for wafer cleaning solution |
| | Roll for transferring wafer |
| | Lining and coating for resist developing solution |

TABLE 3-continued

| Field of industry | Parts |
|---|---|
| | tank and peeling solution tank |
| | Lining and coating for wafer cleaning solution tank |
| | Lining and coating for wet etching tank |
| Transportation means | Engine head gasket |
| | Metal gasket |
| | Crank shaft seal |
| | Cam shaft seal |
| | Valve stem seal |
| | Manifold packing |
| | Oil hose |
| | ATF hose |
| | Injector O-ring |
| | Injector packing |
| | O-ring and diaphragm for fuel pump |
| | Fuel hose |
| Chemical Machinery | Developing roll |
| | Developing roll |
| | Gravure roll |
| | Guide roll |
| | Gravure roll for coating line in production of magnetic tape |
| | Guide roll for coating line in production of magnetic tape |
| | Various coating rolls |
| Foods | |
| Metal | |

Particularly the sealing material of the present invention can be used built in the following semiconductor production apparatuses.

(1) Etching System

Dry etching equipment
  Plasma etching device
  Reactive ion etching device
  Reactive ion beam etching device
  Sputter etching device
  Ion beam etching device
Wet etching equipment
Ashing equipment (2) Cleaning System Dry etching cleaning equipment
  $UV/O_3$ cleaning device
  Ion beam cleaning device
  Laser beam cleaning device
  Plasma cleaning device
  Gas etching cleaning device
Extraction cleaning equipment
  Soxhlet extracting cleaning device
  High temperature high pressure extracting cleaning device
  Micro wave extracting cleaning device
  Supercritical extracting cleaning device (3) Exposing System Stepper
Coater developer (4) Polishing System CMP equipment (5) Film Forming System CVD equipment
Sputtering equipment (6) Diffusion Ion Implantation System Oxidation diffusion equipment
Ion implantation equipment

EXAMPLE

The present invention is then explained based on examples but is not limited to those examples.

Preparation Example 1

Synthesis of Elastomeric Segment A

A 47-liter stainless steel autoclave having no ignition source was charged with 30 liters of pure water, 300 g of $C_7F_{15}COONH_4$ as an emulsifying agent and 300 g of disodium hydrogenphosphaten.$12H_2O$ as a pH adjusting agent, and after replacing the inside of a system with nitrogen gas sufficiently, the autoclave was heated up to 50° C. with stirring at 200 rpm and a gas mixture of tetrafluoroethylene (TFE) and perfluoro(methyl vinyl ether) (PMVE) (TFE/PMVE=32/68 in mole ratio) was introduced so that the inside pressure became 8.0 $kgf/cm^2G$. Then 100 ml of an aqueous solution of ammonium persulfate (APS) having a concentration of 55.8 mg/ml was fed with pressurized nitrogen to initiate a reaction.

At the time when the inside pressure lowered down to 7.0 $kgf/cm^2G$ with advance of polymerization, 27.24 g of diiodine compound $I(CF_2)_4I$ and 234 g of aqueous solution of 10% by weight of $C_7F_{15}COONH_4$ were introduced with pressurized nitrogen. Then 60 g of TFE was fed with self-pressure thereof and 58 g of PMVE was fed with a plunger pump (TFE/PMVE=63/37 in mole ratio) so that the pressure became 8.0 $kgf/cm^2G$. Thereafter TFE and PMVE were fed in the same manner under pressure with advance of the reaction, and thus increasing and lowering of the pressure were repeated between 7 $kgf/cm^2G$ and 8 $kgf/cm^2G$.

Twelve hours after starting the polymerization reaction, when a total charging amount of TFE and PMVE reached 6,000 g, the autoclave was cooled and un-reacted monomer was released to give an aqueous dispersion having a solid content of 18.04% by weight.

A part of the aqueous dispersion was sampled, frozen, coagulated and thawed, followed by washing a coagulated product with water and then vacuum-drying to give a rubber-like polymer. A Mooney viscosity $ML_{1+10}$ (100° C.) of the polymer was 94. An intrinsic viscosity "η" was 0.654 (dl/g, 35° C., FC-75 (available from Three-M Co., Ltd.)).

As a result of $^{19}F$-NMR analysis, monomer components of the polymer were TFE/PMVE=60/40% by mole, and Tg (center value) measured according to DSC analysis was 2° C.

Preparation Example 2

Synthesis of Elastomeric Segment A

A 47-liter stainless steel autoclave having no ignition source was charged with 30 liters of pure water, 300 g of $C_7F_{15}COONH_4$ as an emulsifying agent and 300 g of disodium hydrogenphosphate.$12H_2O$ as a pH adjusting agent, and after replacing the inside of a system with nitrogen gas sufficiently, the autoclave was heated up to 50° C. with stirring at 200 rpm and a gas mixture of tetrafluoroethylene (TFE) and perfluoro(methyl vinyl ether) (PMVE) (TFE/PMVE=32/68 in mole ratio) was introduced so that the inside pressure became 8.0 $kgf/cm^2G$. Then 100 ml of an aqueous solution of ammonium persulfate (APS) having a concentration of 27.9 mg/ml was fed with pressurized nitrogen to initiate a reaction.

At the time when the inside pressure lowered down to 7.0 kgf/cm$^2$G with advance of polymerization, 13.62 g of diiodine compound I(CF$_2$)$_4$I and 117 g of aqueous solution of 10% by weight of C$_7$F$_{15}$COONH$_4$ were introduced with pressurized nitrogen. Then 60 g of TFE was fed with self-pressure thereof and 58 g of PMVE was fed with a plunger pump (TFE/PMVE=63/37 in mole ratio) so that the pressure became 8.0 kgf/cm$^2$G. Thereafter TFE and PMVE were fed in the same manner under pressure with advance of the reaction, and thus increasing and lowering of the pressure were repeated between 7 kgf/cm$^2$G and 8 kgf/cm$^2$G.

Sixteen hours after starting the polymerization reaction, when a total charging amount of TFE and PMVE reached 6,000 g, the autoclave was cooled and un-reacted monomer was released to give an aqueous dispersion having a solid content of 18.16% by weight.

A part of the aqueous dispersion was sampled, frozen, coagulated and thawed, followed by washing a coagulated product with water and then vacuum-drying to give a rubber-like polymer. A Mooney viscosity ML$_{1+10}$ (100° C.) of the polymer could not be measured because the polymer did not melt. An intrinsic viscosity "Θ" was 1.387 (dl/g, 35° C., FC-75 (available from Sumitomo Three-M Co., Ltd.)).

As a result of $^{19}$F-NMR analysis, monomer components of the polymer were TFE/PMVE=60/40% by mole, and Tg (center value) measured according to DSC analysis was 2° C.

Preparation Example 3

Synthesis of Elastomeric Segment A

A 47-liter stainless steel autoclave having no ignition source was charged with 30 liters of pure water, 300 g of C$_7$F$_{15}$COONH$_4$ as an emulsifying agent and 2.7 g of disodium hydrogenphosphate.12H$_2$O as a pH adjusting agent, and after replacing the inside of a system with nitrogen gas sufficiently, the autoclave was heated up to 50° C. with stirring at 200 rpm and a gas mixture of tetrafluoroethylene (TFE) and perfluoro(methyl vinyl ether) (PMVE) (TFE/PMVE=32/68 in mole ratio) was introduced so that the inside pressure became 8.5 kgf/cm$^2$G. Then 100 ml of an aqueous solution of ammonium persulfate (APS) having a concentration of 87.35 mg/ml was fed with pressurized nitrogen to initiate a reaction.

At the time when the inside pressure lowered down to 7.5 kgf/cm$^2$G with advance of polymerization, 61.59 g of diiodine compound I(CF$_2$)$_4$I, 100.4 g of CF$_2$=CFOCF$_2$CF$_2$CH$_2$I and 1,392 g of aqueous solution of 10% by weight of C$_7$F$_{15}$COONH$_4$ were introduced with pressurized nitrogen. Then 60 g of TFE was fed with self-pressure thereof and 66.4 g of PMVE was fed with a plunger pump (TFE/PMVE=60/40 in mole ratio) so that the pressure became 8.5 kgf/cm$^2$G. Thereafter TFE and PMVE were fed in the same manner under pressure with advance of the reaction, and thus increasing and owering of the pressure were repeated between 7.5 kgf/cm$^2$G and 8.5 kgf/cm$^2$G.

Sixty-nine hours after starting the polymerization reaction, when a total charging amount of TFE and PMVE reached 14 kg, the autoclave was cooled and un-reacted monomer was released to give an aqueous dispersion having a solid content of 30% by weight.

A part of the aqueous dispersion was sampled, frozen, coagulated and thawed, followed by washing a coagulated product with water and then vacuum-drying to give a rubber-like polymer. A Mooney viscosity ML$_{1+10}$ (100° C.) of the polymer was 68.

As a result of $^{19}$F-NMR analysis, monomer components of the polymer were TFE/PMVE=60/40% by mole, and Tg (center value) measured according to DSC analysis was -4° C.

Preparation Example 4

Synthesis of Elastomeric Segment A

A 47-liter stainless steel autoclave having no ignition source was charged with 30 liters of pure water, 300 g of

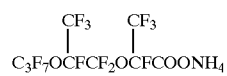

as an emulsifying agent and 300 g of disodium hydrogenphosphate.12H$_2$O as a pH adjusting agent, and after replacing the inside of a system with nitrogen gas sufficiently, the autoclave was heated up to 50° C. with stirring at 200 rpm and a gas mixture of tetrafluoroethylene (TFE) and perfluoro(methyl vinyl ether) (PMVE) (TFE/PMVE=32/68 in mole ratio) was introduced so that the inside ressure became 8.0 kgf/cm$^2$G. Then 100 ml of an aqueous solution of ammonium persulfate (APS) having a concentration of 55.8 mg/ml was fed with pressurized nitrogen to initiate a reaction.

At the time when the inside pressure lowered down to 7.0 kgf/cm$^2$G with advance of polymerization, 109 g of diiodine compound I(CF$_2$)$_4$I and 363 g of aqueous solution of 10% by weight of C$_7$F$_{15}$COONH$_4$ were introduced with pressurized nitrogen. Then 60 g of TFE was fed with self-pressure thereof and 58 g of PMVE was fed with a plunger pump (TFE/PMVE=63/37 in mole ratio) so that the pressure became 8.0 kgf/cm$^2$G. Thereafter TFE and PMVE were fed in the same manner under pressure with advance of the reaction, and thus increasing and lowering of the pressure were repeated between 7 kgf/cm$^2$G and 8 kgf/cm$^2$G.

Seventeen hours after starting the polymerization reaction, when a total charging amount of TFE and PMVE reached 6,000 g, the autoclave was cooled and un-reacted monomer was released to give an aqueous dispersion having a solid content of 16.00% by weight.

A part of the aqueous dispersion was sampled, frozen, coagulated and thawed, followed by washing a coagulated product with water and then vacuum-drying to give a rubber-like polymer. A Mooney viscosity ML$_{1+10}$ (100° C.) of the polymer was 1. MFR of the polymer was intended to measure at 160° C. at a load of 5 kgf/cm$^2$, but could not be obtained because of too much flow thereof.

As a result of $^{19}$F-NMR analysis, monomer components of the polymer were TFE/PMVE=66/34% by mole, and Tg (center value) measured according to DSC analysis was -9° C.

Example 1

Block Copolymerization of Non-elastomeric Segment B

A 3-liter stainless steel autoclave was charged with 1,096 g of the aqueous dispersion obtained in Preparation Example 1 and 4.15 g of perfluoro(propyl vinyl ether) (PPVE). After replacing the inside of a system with nitrogen gas sufficiently, the inside temperature was kept at 80° C. With stirring at 400 rpm, tetrafluoroethylene (TFE) was introduced under pressure so that the inside pressure became 8.0 kgf/cm²G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 7.0 kgf/cm²G, it was again raised with TFE up to 8.0 kgf/cm²G, and thus increasing and lowering of the pressure were repeated between 7.0 kgf/cm²G and 8.0 kgf/cm²G.

At the time when 29.6 g of TFE was consumed after starting of polymerization, supplying thereof was stopped, the autoclave was cooled and un-reacted monomer was released to give 1,132 g of a semi-transparent aqueous dispersion.

A solid content of the obtained aqueous dispersion was 19.6% by weight, and a particle size thereof measured by dynamic light scattering method was 55.3 nm.

A proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 16.2% by weight.

The obtained aqueous dispersion was frozen and coagulated, and the precipitated polymer was washed and dried to give a white solid.

According to $^{19}$F-NMR analysis, components of the non-elastomeric segment in the obtained fluorine-containing multi-segment polymer was TFE/PPVE=99.5/0.5% by mole. Also according to DSC analysis, a glass transition temperature of the elastomeric segment A was 2° C. and a crystalline melting point of the non-elastomeric segment B was 324° C.

Example 2

Block Copolymerization of Non-elastomeric Segment B

A 3-liter stainless steel autoclave was charged with 993.7 g of the aqueous dispersion obtained in Preparation Example 2 and 10.3 g of perfluoro(propyl vinyl ether) (PPVE). After replacing the inside of a system with nitrogen gas sufficiently, the inside temperature was kept at 80° C. With stirring at 400 rpm, tetrafluoroethylene (TFE) was introduced under pressure so that the inside pressure became 8.0 kgf/cm²G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 7.0 kgf/cm²G, it was again raised with TFE up to 8.0 kgf/cm²G, and thus increasing and lowering of the pressure were repeated between 7.0 kgf/cm²G and 8.0 kgf/cm²G.

At the time when 57.0 g of TFE was consumed after starting of polymerization, supplying thereof was stopped, the autoclave was cooled and un-reacted monomer was released to give 1,200 g of a semi-transparent aqueous dispersion.

A solid content of the obtained aqueous dispersion was 20.0% by weight, and a particle size thereof measured by dynamic light scattering method was 53.4 nm.

A proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 24.8% by weight.

The obtained aqueous dispersion was frozen and coagulated, and the precipitated polymer was washed and dried to give a white solid.

According to $^{19}$F-NMR analysis, components of the non-elastomeric segment B in the obtained fluorine-containing multi-segment polymer was TFE/PPVE=98.9/1.1% by mole. Also according to DSC analysis, a glass transition temperature of the elastomeric segment A was 2° C. and a crystalline melting point of the non-elastomeric segment B was 310° C.

Example 3

Block Copolymerization of Non-elastomeric Segment B

A 6-liter stainless steel autoclave was charged with 3,000 g of the dispersion obtained in Preparation Example 3. After replacing the inside of a system with nitrogen gas sufficiently, the inside temperature was kept at 80° C. With stirring at 600 rpm, tetrafluoroethylene (TFE) was introduced under pressure so that the inside pressure became 2.0 kgf/cm²G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 1.5 kgf/cm²G, it was again raised with TFE up to 2.0 kgf/cm²G, and thus increasing and lowering of the pressure were repeated between 1.5 kgf/cm²G and 2.0 kgf/cm²G.

At the time when about 10 g of TFE was consumed after starting of polymerization, supplying thereof was stopped, the autoclave was cooled and un-reacted monomer was released to give 3,011 g of a semi-transparent aqueous dispersion.

A solid content of the obtained aqueous dispersion was 31.3% by weight. A proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 4.5% by weight.

The obtained aqueous dispersion was frozen and coagulated, and the precipitated polymer was washed and dried to give a white solid.

According to DSC analysis, a glass transition temperature of the elastomeric segment A was −4° C. and a crystalline melting point of the non-elastomeric segment B was 263° C. A Mooney viscosity $ML_{1+10}$ (140° C.) of the fluorine-containing multi-segment polymer was 101.

Example 4

Block Copolymerization of Non-elastomeric Segment B

A 6-liter stainless steel autoclave was charged with 3,000 g of the dispersion obtained in Preparation Example 3. After replacing the inside of a system with nitrogen gas sufficiently, the inside temperature was kept at 80° C. With stirring at 600 rpm, tetrafluoroethylene (TFE) was introduced under pressure so that the inside pressure became 2.0 kgf/cm²G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 1.5 kgf/cm$^2$G, it was again raised with TFE up to 2.0 kgf/cm$^2$G, and thus increasing and lowering of the pressure were repeated between 1.5 kgf/cm$^2$G and 2.0 kgf/cm$^2$G.

At the time when about 120 g of TFE was consumed after starting of polymerization, supplying thereof was stopped, the autoclave was cooled and un-reacted monomer was released to give 3,137 g of a semi-transparent aqueous dispersion.

A solid content of the obtained aqueous dispersion was 19.6% by weight, and a particle size measured by dynamic light scattering method was 55.3 nm.

A proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 18.5% by weight.

The obtained aqueous dispersion was frozen and coagulated, and the precipitated polymer was washed and dried to give a white solid.

According to DSC analysis, a glass transition temperature of the elastomeric segment A was −4° C. and a crystalline melting point of the non-elastomeric segment B was 328° C. A Mooney viscosity (140° C.) of the fluorine-containing multi-segment polymer could not be measured because the polymer did not melt.

Example 5

Block Copolymerization of Non-elastomeric Segment B

A 6-liter glass-lined autoclave was charged with 2,000 g of the dispersion obtained in Preparation Example 4. After replacing the inside of a system with nitrogen gas sufficiently, the inside temperature was kept at 50° C. With stirring at 600 rpm, tetrafluoroethylene (TFE) was introduced under pressure so that the inside pressure became 8.0 kgf/cm$^2$G.

Then a solution prepared by dissolving 20 mg of ammonium persulfate (APS) in 8 ml of water was introduced with pressurized nitrogen to initiate a reaction.

Since the inside pressure lowered down with advance of polymerization reaction, at the time when it lowered to 7.5 kgf/cm$^2$G, it was again raised with TFE up to 8.0 kgf/cm$^2$G, and thus increasing and lowering of the pressure were repeated between 7.5 kgf/cm$^2$G and 8.0 kgf/cm$^2$G.

At the time when about 9 g, 28 g and 45 g of TFE was consumed, respectively after starting of polymerization, about 13 g each of perfluoro-(8-cyano-5-methyl-3,6-dioxa-1-octene) (CNVE) was fed with pressurized nitrogen.

At the time when about 66 g of TFE was consumed after starting of polymerization, supplying thereof was stopped, the autoclave was cooled and un-reacted monomer was released to give 2,242 g of a semi-transparent aqueous dispersion.

A solid content of the obtained aqueous dispersion was 17.9% by weight, and a proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 20.3% by weight.

The obtained aqueous dispersion was frozen and coagulated, and the precipitated polymer was washed with 141b and vacuum-dried at 60° C. to give a white solid.

Components of the non-elastomeric segment B was TFE/CNVE=96.5/3.5 (in mole ratio) according to IR analysis. MFR of the fluorine-containing multi-segment polymer at 160° C. at a load of 5 kgf/cm2 was $4.9 \times 10^{-2}$ g/10 min.

Example 6

Block Copolymerization of Non-elastomeric Segment B

A 6-liter glass-lined autoclave was charged with 2,000 g of the dispersion obtained in Preparation Example 4. After replacing the inside of a system with nitrogen gas sufficiently, the inside temperature as kept at 80° C. With stirring at 600 rpm, vinylidene fluoride (VdF) as introduced under pressure so that the inside pressure became 8.0 kgf/cm$^2$G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 7.5 kgf/cm$^2$G, it was again raised with VdF up to 8.0 kgf/cm$^2$G, and thus increasing and lowering of the pressure were repeated between 7.5 kgf/cm$^2$G and 8.0 kgf/cm$^2$G.

During the polymerization, ammonium pursulfate (APS) was added additionally to keep the polymerization speed properly.

At the time when about 50 g of VdF was consumed, supplying thereof was stopped, the autoclave was cooled and un-reacted monomer was released to give 2,057 g of a semi-transparent aqueous dispersion.

A solid content of the obtained aqueous dispersion was 18.2% by weight, and a proportion of the non-elastomeric segment B to the whole polymer which was calculated frim an increase in yield of polymer, namely ((Yield of polymer obtained in post polymerization)−(Amount of polymer charged))÷(Yield of polymer obtained in post polymerization)×100 was 14.5% by weight.

The obtained aqueous dispersion was coagulated with nitric acid, and the precipitated polymer was washed and dried to give a white solid.

According to DSC analysis, a glass transition temperature of the elastomeric segment A was −9° C. and a crystalline melting point of the non-elastomeric segment B was 162° C. MFR of the fluorine-containing multi-segment polymer at 160° C. at a load of 5 kgf/cm$^2$ was $7.2 \times 10^{-3}$ g/10 min.

Example 7

Block Copolymerization of Non-elastomeric Segment B

A 6-liter glass-lined autoclave was charged with 2,000 g of the dispersion obtained in Preparation Example 4. After replacing the inside of a system with nitrogen gas sufficiently, the inside temperature was kept at 80° C. With stirring at 600 rpm, a gas mixture of tetrafluoroethylene (TFE), ethylene (Et) and hexafluoropropylene (HFP) (TFE/Et/HFP=67/16/17 in mole ratio) was introduced so that the inside pressure became 8.0 kgf/cm$^2$G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 7.5 kgf/cm$^2$G, it was again raised with a gas mixture of TFE/Et/HFP (47/46/7 in mole ratio) up to 8.0 kgf/cm$^2$G, and thus increasing and lowering of the pressure were repeated between 7.5 kgf/cm$^2$G and 8.0 kgf/cm$^2$G.

During the polymerization, ammonium pursulfate (APS) was added additionally to keep the polymerization speed properly.

At the time when about 54 g of the above-mentioned gas mixture was consumed after starting of polymerization, supplying thereof was stopped, the autoclave was cooled and un-reacted monomer was released to give 2,258 g of a semi-transparent aqueous dispersion.

A solid content of the obtained aqueous dispersion was 17.0% by weight, and a proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 16.6% by weight.

The obtained aqueous dispersion was coagulated with nitric acid, and the precipitated polymer was washed and dried to give a white solid.

According to DSC analysis, a glass transition temperature of the elastomeric segment A was −9° C. and a crystalline melting point of the non-elastomeric segment B was 198° C. MFR of the fluorine-containing multi-segment polymer at 160° C. at a load of 5 kgf/cm$^2$ was 1.2×10$^{-1}$ g/10 min.

Example 8

Block Copolymerization of Non-elastomeric Segment B

A 6-liter glass-lined autoclave was charged with 2,000 g of the dispersion obtained in Preparation Example 4. After replacing the inside of a system with nitrogen gas sufficiently, the inside temperature was kept at 80° C. With stirring at 600 rpm, tetrafluoroethylene (TFE) was introduced under pressure so that the inside pressure became 2.0 kgf/cm$^2$G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 1.5 kgf/cm$^2$G, it was again raised with TFE up to 2.0 kgf/cm$^2$G, and thus increasing and lowering of the pressure were repeated between 1.5 kgf/cm 2G and 2.0 kgf/cm$^2$G.

At the time when about 77 g of TFE was consumed after starting of polymerization, supplying thereof was stopped, the autoclave was cooled and un-reacted monomer was released to give 2,063 g of a semi-transparent aqueous dispersion.

A polymer content of the obtained aqueous dispersion was 19.8% by weight, and a proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 21.6% by weight.

The obtained aqueous dispersion was coagulated with nitric acid, and the precipitated polymer was washed and dried to give a white solid.

In measuring MFR of the fluorine-containing multi-segment polymer at 160° C. at a load of 5 kgf/cm$^2$, the polymer did not flow.

Reference Example 1

Synthesis of Fluorine-containing Multi-segment Polymer Having an Elastomeric Segment Comprising Component Units Other Than Perhaloolefin (1) Synthesis of Elastomeric Segment A A 6-liter stainless steel autoclave was charged with 3,000 g of pure water and 6 g of ammonium perfluorooctanoate. After the inside of the autoclave was replaced with pure nitrogen gas completely, a pressure inside the autoclave was increased at 80° C. with stirring up to 15 kg/cm$^2$G with a gas mixture of vinylidene fluoride (VdF), tetrafluoroethylene (TFE) and hexafluoropropylene (HFP) (VdF/TFE/HFP=69/11/20 in mole ratio). Since lowering of a pressure occurs immediately after 4 g of 1% aqueous solution of ammonium persulfate (APS) is introduced under pressure, a reaction was continued while a gas mixture of VdF/TFE/HFP (50/20/30 in mole ratio) was fed under pressure to keep the pressure. At the time when 2 g of the additional gas mixture was consumed, 3.1 g of 1,4-diiodoperfluorobutane was fed under pressure. Thereafter the reaction was continued for 15 hours while feeding 2 g of 1% aqueous solution of APS every three hours. Then the temperature was lowered rapidly and gas was released to terminate the reaction. Thus a white aqueous dispersion having a solid content of 25% was obtained. A part of the dispersion was sampled, and coagulated with a line mixer having a strong shearing force. The coagulate was washed with water and dried to give a colorless transparent elastomeric polymer. According to $^{19}$F-NMR analysis, components of the copolymer was VdF/TFE/HFP=50/20/30% by mole, and according to DSC analysis, a glass transition temperature thereof was −10° C. "η" was 0.65 (dl/g, 35° C., MEK). A Mooney viscosity ML$_{1+20}$ (100° C.) was 75.

(2) Block Copolymerization of Non-elastomeric Segment B

A 6-liter stainless steel autoclave was charged with 3,000 g of the dispersion obtained in above (1). After the inside a system was replaced with nitrogen gas, a temperature inside the system was maintained at 80° C. With stirring at 200 rpm, tetrafluoroethylene (TFE) was fed under pressure so that the inside pressure became 1.0 kgf/cm$^2$G.

Then a solution prepared by dissolving 10 mg of ammonium persulfate in 2 ml of water was introduced with pressurized nitrogen to initiate a reaction.

Since the inside pressure lowered down with advance of polymerization reaction, at the time when it lowered to 0 kgf/cm$^2$G, it was again raised with TFE up to 1.0 kgf/cm$^2$G, and thus increasing and lowering of the pressure were repeated between 0 kgf/cm$^2$G and 1.0 kgf/cm$^2$G.

At the time when about 40 g of TFE was consumed after starting of polymerization, supplying thereof was stopped, the autoclave was cooled and un-reacted monomer was released to give 3,061 g of a semi-transparent aqueous dispersion.

A solid content of the obtained aqueous dispersion was 25.5%, and a proportion of the non-elastomeric segment B to the whole polymer which was calculated from an increase in yield of polymer, namely ((Yield of polymer obtained in post polymerization)−(Amount of polymer charged))÷Yield of polymer obtained in post polymerization)×100 was 4.5% by weight.

The obtained aqueous dispersion was frozen and coagulated, and the precipitated polymer was washed and dried to give a white solid.

According to DSC analysis, Tg of the elastomeric segment A was −4° C. and a crystalline melting point of the non-elastomeric segment B was 305° C. A Mooney viscosity $ML_{1+20}$ (100° C.) of the fluorine-containing multi-segment polymer was 89 and $ML_{1+10}$ (140° C.) thereof was 41.

Reference Example 2

Blend of Elastomeric Segment A and Non-elastomeric Segment B 13.5 G (15% by weight) of a copolymer (NEOFLON PFA AP-201 available from DAIKIN INDUSTRIES, LTD.) of tetrafluoroethylene and perfluoro(propyl vinyl ether) was put in a Brabender mixer of 60 cm³ which was set at 350° C. After melting at 10 rpm for three minutes, 73.5 g (85% by weight) of a polymer consisting of the elastomeric segment A obtained in Preparation Example 1 was added and kneading was carried out at 30 rpm for five minutes to give a composition.

Reference Example 3

Blend of Elastomeric Segment A and Non-elastomeric Segment B

A composition was prepared by kneading in the same manner as in Reference Example 2 except that 22.5 g (25% by weight) of the copolymer (same as in Reference Example 2) of tetrafluoroethylene and perfluoro(propyl vinyl ether) and 67.5 g (75% by weight) of the polymer consisting of the elastomeric segment A and obtained in Preparation Example 1 were used.

Examples 9 to 15 and Comparative Examples 1 to 2

Measurement of Blocking Ratio

A blocking ratio was measured by the method mentioned below with respect to the fluorine-containing multi-segment polymers obtained in Examples 1, 2, 4, 5, 6, 7 and 8 and Reference Example 1 and the composition (prepared by blending the elastomeric fluorine-containing polymer obtained in Preparation Example 1 and the non-elastomeric fluorine-containing polymer PFA) obtained in Reference Example 2. The results are shown in Table 4.

Measurement of Blocking Ratio

The blocking ratio represents a ratio indicating what percentage of the elastomeric segment A which is a starting material is blocked (or segmented) in a process for preparing a fluorine-containing multi-segment polymer by post-polymerizing a polymer obtained in the first step (synthesis of elastomeric segment A). The blocking ratio was measured by the following method.

The fluorine-containing multi-segment polymers obtained in Examples 1, 2, 4, 5, 6, 7 and 8 (Examples 9 to 15) and the polymer obtained in Reference Example 2 (Comparative Example 2) were put in FLORINATE (registered trademark) FC-75 (available from Sumitomo Three M Co., Ltd.) in an amount of D g, respectively and the polymer obtained in Reference Example 1 (Comparative Example 1) was put in acetone in an amount of 5% by weight, followed by sealing and allowing to stand at 60° C. for 24 hours.

Since elution of polymer molecule consisting of the elastomeric segment A which had not been blocked occurs, a solution and impurities were separated and a solution was taken and dried at 120° C. for one hour. Then a concentration of polymer elution was measured and an amount (C) of elution of polymer (consisting of a fluorine-containing elastomeric polymer) was obtained. Thus a blocking ratio was calculated by the following equation.

$$\text{Blocking ratio (\%)}: \frac{\text{Blocked fluorine-containing elastomeric polymer}}{\text{Fluorine-containing elastomeric polymer used for post polymerization}} = \left(1 - \frac{(C)}{(D) \times (\text{Theoretical}) \text{ content of fluorine-containing elastomeric polymer}}\right) \times 100$$

TABLE 4

| Sample Used | Ex. 9 Ex. 1 | Ex. 10 Ex. 2 | Ex. 11 Ex. 4 | Ex. 12 Ex. 5 | Ex. 13 Ex. 6 |
|---|---|---|---|---|---|
| Elastomer components | TFE/PMVE | TFE/PMVE | TFE/PMVE | TFE/PMVE | TFE/PMVE |
| Non-elastomer components | TFE/PPVE | TFE/PPVE | TFE | TFE/CNVE | VdF |
| Content of non-elastomeric segment (% by weight) | 16.2 | 24.8 | 18.5 | 20.3 | 14.5 |
| Content of elastomeric segment (% by weight) | 83.8 | 85.2 | 81.5 | 79.7 | 85.5 |
| Blocking ratio (%) | 94 | 99 | 97 | 67.9 | 84.6 |

| Sample tested | Ex. 14 Ex. 7 | Ex. 15 Ex. 8 | Com. Ex. 1 Ref. Ex. 1 | Com. Ex. 2 Ref. Ex. 2 |
|---|---|---|---|---|
| Elastomer components | TFE/PMVE | TFE/PMVE | VdF/TFE/HFP | TFE/PMVE |
| Non-elastomer components | TFE/Et/HFP | TFE | TFE | TFE/PPVE |
| Content of non-elastomeric segment (% by weight) | 16.6 | 21.6 | 4.5 | Blend (15) |

TABLE 4-continued

| | | | | |
|---|---|---|---|---|
| Content of elastomeric segment (% by weight) | 83.4 | 78.4 | 95.5 | Blend (85) |
| Blocking ratio (%) | 84.0 | 76.8 | 45.5 | 0 (completely melted) |

Examples 16 to 18 and Comparative xamples 3 to 4

Measurement of Physical Properties

The fluorine-containing multi-segment polymers obtained in Examples 1 and 2 and the compositions obtained in Reference Examples 2 and 3 were put in a metal die of 100 mm diameter, respectively and set on a press machine of 350° C. After preheating for 30 minutes, compression molding was carried out at 70 kgf/cm$^2$ for one minute to give an about 0.5 mm thick film.

With respect to the fluorine-containing multi-segment polymer obtained in Example 3, compression molding was carried out in the same manner as above except that a press machine of 160° C. was used, to give an about 2 mm thick sheet.

The following various physical properties were measured by using the obtained molded film and sheet. The results are shown in Table 5.

(1) Hardness

Hardness A was measured according to JIS K 6301.

(2) Tensile Strength

The above-mentioned respective films and sheet were cut to a form of dumbbell described in ASTM-1467, and measurements were carried out at a cross head speed of 200 mm/min by using a TENSILON universal tester available from Orientec Corporation.

(3) Visco-elasticity

The films and sheet were cut to a form of strip of about 35×5 mm and set on a visco-elasticity meter RSA-2 available from Rheometric Co., Ltd. Then a visco-elasticity was measured at a frequency of 1 Hz at each temperature.

Example 19

Block Copolymerization of Non-elastomeric Segment B

A 6-liter stainless steel autoclave was charged with 3,000 g of aqueous dispersion prepared in Preparation Example 1 and 34 g of perfluoro(propyl vinyl ether) (PPVE). After the inside of the autoclave was replaced with nitrogen gas sufficiently, a pressure inside the autoclave was maintained at 80° C. With stirring at 600 rpm, tetrafluoroethylene (TFE) was introduced under pressure so that the inside pressure became 3.0 kgf/cm$^2$G.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 2.5 kgf/cm$^2$G, it was again raised with TFE up to 3.0 kgf/cm$^2$G, and thus increasing and lowering of the pressure were repeated between 2.5 kgf/cm$^2$G and 3.0 kgf/cm$^2$G.

At the time when 84.8 g of TFE was consumed after starting polymerization, supplying thereof was stopped, the autoclave was cooled and un-reacted monomer was released to give 3,125 g of a semi-transparent aqueous dispersion. A solid content of the obtained aqueous dispersion was 20.2% by weight.

A proportion of the non-elastomeric segment B to the whole polymer which was calculated from an increase in yield of polymer, namely ((Yield of polymer obtained in post polymerization)−(Amount of polymer charged))÷(Yield of polymer obtained in post polymerization)×100 was 14.3% by weight.

The obtained aqueous dispersion was coagulated with nitric acid, and the precipitated polymer was washed and

TABLE 5

| Samples used | Ex. 16 Ex. 1 | Ex. 17 Ex. 2 | Ex. 18 Ex. 3 | Com. Ex. 3 Ref. Ex. 2 | Com. Ex. 4 Ref. Ex. 3 |
|---|---|---|---|---|---|
| Non-elastomer components | TFE/PPVE | TFE/PPVE | TFE | Blended composition of preparation Example 1 and PFA (85/15) | Blended composition of preparation Example 1 and PFA (75/25) |
| Content of non-elastomer components (% by weight) | 16.2 | 24.8 | 4.5 | | |
| Hardness | 66 | 77 | 64 | 64 | 74 |
| Tensile strength (kgf/cm$^2$) | 43 | 103 | 64 | 14 | 31 |
| Tensile modulus (dyn/cm$^2$) | | | | | |
| 25° C. | 7.2 × 10$^7$ | 3.4 × 10$^8$ | — | 8.4 × 10$^7$ | 2.1 × 10$^8$ |
| 50° C. | 6.2 × 10$^7$ | 2.4 × 10$^8$ | — | 7.1 × 10$^7$ | 1.8 × 10$^8$ |
| 100° C. | 5.3 × 10$^7$ | 1.6 × 10$^8$ | — | 2.7 × 10$^7$ | 9.1 × 10$^7$ |
| 150° C. | 4.4 × 10$^7$ | 1.3 × 10$^8$ | — | 7.8 × 10$^5$ | 4.6 × 10$^7$ | dried to give a white solid. A Mooney viscosity $ML_{1+10}$ (140° C.) of the solid was 109.

According to 19F-NMR analysis, components of the non-elastomeric segment B in the obtained fluorine-containing multi-segment polymer was TFE/PPVE=93.1/6.9% by mole.

Example 20

Block Copolymerization of Non-elastomeric Segment B

A 6-liter stainless steel autoclave was charged with 3,000 g of the aqueous dispersion prepared in Preparation Example 1 and 68 g of perfluoro(propyl vinyl ether) (PPVE). After the inside of the autoclave was replaced with nitrogen gas sufficiently, a pressure inside the autoclave was maintained at 15° C. With stirring at 400 rpm, tetrafluoroethylene (TFE) was introduced under pressure so that the inside pressure became 3.0 $kgf/cm^2G$.

Then a solution prepared by dissolving 10 mg of ammonium persulfate (APS) in 2 ml of water was introduced with pressurized nitrogen to initiate a reaction.

Since the inside pressure lowered down with advance of polymerization reaction, at the time when it lowered to 2.5 $kgf/cm^2G$, it was again raised with TFE up to 3.0 $kgf/cm^2G$, and thus increasing and lowering of the pressure were repeated between 2.5 $kgf/cm^2G$ and 3.0 $kgf/cm^2G$.

At the time when 67.5 g of TFE was consumed (207 minutes after), supplying thereof was stopped, the autoclave was cooled and un-reacted monomer was released to give 3,154 g of a semi-transparent aqueous dispersion.

A solid content of the obtained aqueous dispersion was 19.3% by weight.

A proportion of the non-elastomeric segment B to the whole polymer which was calculated from an increase in yield of polymer, namely ((Yield of polymer obtained in post polymerization)–(Amount of polymer charged))÷(Yield of polymer obtained in post polymerization)×100 was 11.0% by weight.

The obtained aqueous dispersion was coagulated with nitric acid, and the precipitated polymer was washed and dried to give a white solid. A Mooney viscosity $ML_{1+10}$ (140° C.) of the solid was 101.

According to $^{19}$F-NMR analysis, components of the non-elastomeric segment B in the obtained fluorine-containing multi-segment polymer was TFE/PPVE=90.3/9.7% by mole.

Examples 21 and 22

The fluorine-containing multi-segment polymers obtained in Examples 19 and 20, respectively, 2,5-dimethyl-2,5-di(t-butylperoxy)hexane (brand name PERHEXA 2.5B available from NOF CORPORATION) as an organic peroxide and triallylisocyanurate (TAIC) available from Nippon Kasei Kabushiki Kaisha as a crosslinking aid were mixed in a weight ratio of 100/1/1 and kneaded with an open roll to give a crosslinkable molding composition.

The crosslinkable molding composition was vulcanized by pressing at 160° C. for 10 minutes and then further vulcanized in an oven at 180° C. for four hours to give a 2 mm thick vulcanized sample.

With respect to the vulcanized sample, the following physical properties were measured.

Mechanical Properties

A 100% modulus, tensile strength, tensile elongation and hardness (JIS hardness A) at normal condition (25° C.) were measured according to JIS K 6301.

The results are shown in Table 6.

Comparative Example 5

The aqueous dispersion obtained in Preparation Example 1 was coagulated as it is with nitric acid, and the precipitated polymer was washed and dried to give 353 g of rubber-like article.

Then a molding composition for comparison was prepared in the same manner as in Example 21 except that the rubber-like article was used instead of the white solid, and a vulcanization was carried out in the same manner as in Example 21 to give a sample.

With respect to the obtained sample for comparison, physical properties thereof were measured in the same manner as in Example 21. The results are shown in Table 6.

TABLE 6

|  | Ex. 21 | Ex. 22 | Com. Ex. 5 |
|---|---|---|---|
| Components |  |  |  |
| Fluorine-containing multi-segment polymer (part by weight) | Ex. 19 (100) | Ex. 20 (100) | Prep. Ex. 1 (100) |
| PERHEXA 2.5B (part by weight) | 1.0 | 1.0 | 1.0 |
| TAIC (part by weight) | 1.0 | 1.0 | 1.0 |
| Mechanical properties |  |  |  |
| 100% modulus ($kgf/cm^2$) | 34 | 28 | 15 |
| Tensile strength ($kgf/cm^2$) | 223 | 191 | 149 |
| Tensile elongation (%) | 220 | 230 | 220 |
| Hardness (JIS A) | 72 | 71 | 63 |

As it is evident from Table 6, when the fluorine-containing multi-segment polymer of the present invention is used, a vulcanized article excellent in mechanical properties can be obtained.

Example 23

A molded sheet (containing no crosslinking agent) of Example 18 obtained by using the fluorine-containing multi-segment polymer of Example 3 was put in a glass vessel having a valve. After repeating decrease and increase in pressure with nitrogen gas, deaeration was carried out, followed by irradiating 10 MRad of γ-ray of cobalt 60 for crosslinking.

With respect to a sheet not subjected to irradiation and the obtained crosslinked sheet, mechanical properties thereof (100% modulus, tensile strength, tensile elongation) were measured in the same manner as in Example 21.

The results are shown in Table 7.

Example 24

A composition prepared by mixing 0.2 part of triallylisocyanurate (TAIC) and 0.3 part of 1,3,5-tris(2,3,3-trifluoro-2-propenyl)-1,3,5-triazine-2,4,6-trion (F-TAIC) to 100 parts of fluorine-containing multi-segment polymer obtained in Example 3 was compression-molded at 160° C., followed by cooling to 100° C. to give a molded sheet.

The sheet was subjected to irradiation of γ-ray for crosslinking in the same manner as in Example 23 to give a crosslinked sheet, and mechanical properties thereof were measured in the same manner as in Example 23. Also with respect to the sheet not subjected to crosslinking, mechanical properties were measured in the same manner.

The results are shown in Table 7.

TABLE 7

|  | Ex. 23 | | Ex. 24 | |
| --- | --- | --- | --- | --- |
| Components | | | | |
| Fluorine-containing multi-segment polymer (part by weight) | Ex. 3 (100) | | Ex. 3 (100) | |
| TAIC (part by weight) | — | | 0.2 | |
| F-TAIC (part by weight) | — | | 0.3 | |
| Radiation exposure | Non-irradiated sheet | Cross-linked sheet | Non-irradiated sheet | Cross-linked sheet |
| Quantity of radiation (Mrad) | 0 | 10 | 0 | 10 |
| Mechanical properties | | | | |
| 100% modulus (kgf/cm²) | 23 | 22 | 21 | 30 |
| Tensile strength (kgf/cm²) | 64 | 74 | 59 | 123 |
| Tensile elongation (%) | 320 | 380 | 360 | 250 |

As shown in Table 7, a molded article excellent in mechanical properties, particularly tensile strength can be obtained also by crosslinking by radiation (γ-ray).

Example 25 and Reference Example

The fluorine-containing multi-segment polymer obtained in Example 6 was kneaded in an open roll and put in a metal die, followed by pre-molding under the conditions shown in Table 8. The obtained pre-molded article was subjected to electron beam irradiation in the air to give a crosslinked molded article.

With respect to the crosslinked molded article, the following physical properties were measured. The results are shown in Table 8. For reference purpose, physical properties of a pre-molded article not subjected to electron beam irradiation are also shown in Table 8.

Mechanical Properties

A 50% modulus, tensile strength, tensile elongation and hardness (JIS hardness A) were measured under normal condition (25° C.) according to JIS K 6301.

TABLE 8

|  | Ex. 25 | Reference Example |
| --- | --- | --- |
| Polymer used | Ex. 6 | Ex. 6 |
| Molding conditions | | |
| Press temperature (° C.) | 180 | 180 |
| Pressing pressure (kgfG) | 10 | 10 |
| Pre-heating time (min) | 10 | 10 |
| Pressing time (min) | 10 | 10 |
| Cooling time (min) | 10 | 10 |
| Irradiation of electron beams | | |
| Quantity of radiation (KGy) | 50 | 0 |
| Mechanical properties | | |
| Hardness (JIS A) | 72 | 72 |
| Tensile strength (kgf/cm²) | 64 | 58 |
| Tensile elongation (%) | 150 | 218 |
| 50% tensile stress (kgf/cm²) | 23 | 17 |

Examples 26 to 28

The fluorine-containing multi-segment polymers obtained in Examples 6, 7 and 8, respectively, 2,5-dimethyl-2,5-di(t-butylperoxy)hexane (brand name PERHEXA 2.5B available from NOF CORPORATION) as an organic peroxide and triallylisocyanurate (TAIC) (available from Nippon Kasei Kabushiki Kaisha) as a crosslinking aid were mixed in a weight ratio of 100/0.5/1 and kneaded with an open roll to give a crosslinkable molding composition.

The crosslinkable molding composition was vulcanized by pressing at 160° C. for 20 minutes and then further vulcanized in an oven at 180° C. for four hours to give a vulcanized sample in the form of sheet of 20×20×2 mm.

With respect to that vulcanized sample, the following physical properties were measured. The results are shown in Table 9.

Mechanical Properties

Same as Example 25. Compression set (100° C., 24 hours) was measured according to JIS K 6301.

Plasma Resistance

A plasma was generated with a plasma dry cleaner Model PX-1000 available from Kabushiki Kaisha Samco International Kenkyusho under the conditions of a vacuum pressure of 50 mTorr, an oxygen flow of 200 cc/min, electric power of 400 W and a frequency of 13.56 KHz, and irradiated to the sample (20×20×2 mm) for 30 minutes under the reactive ion etching (RIE) conditions.

Plasma resistance was evaluated by a percentage of weight reduction after the irradiation and the number of particles generated.

Percentage of Weight Reduction

A weight of sample before and after the plasma irradiation was measured in 1/100 mg, and a percentage of weight reduction (%/cm²) per unit area of irradiation (mm²) was calculated by the following equation.

$$\text{Percentage of weight reduction} = \frac{\text{Weight before irradiation (mg)} - \text{Weight after irradiation (mg)}}{\text{Irradiation area of sample (mm}^2\text{)} \times \text{Weight before irradiation (mg)}}$$

Since the irradiation was carried out under the RIE condition where the plasma was irradiated down vertically toward the sample, irradiated portion (area) of the sample was a top area of the sample, i.e. 400 mm² (20 mm×20 mm).

TABLE 9

|  | Ex. 26 | Ex. 27 | Ex. 28 |
| --- | --- | --- | --- |
| Polymer used | Ex. 6 | Ex. 7 | Ex. 8 |
| Molding conditions | | | |
| Press temperature (° C.) | 160 | 160 | 160 |
| Pressing pressure (kgfG) | 100 | 100 | 100 |
| Pressing time (min) | 20 | 20 | 10 |
| Secondary vulcanizing conditions | | | |
| Vulcanizing temperature (° C.) | 180 | 180 | 180 |
| Vulcanizing time (hr) | 4 | 4 | 4 |
| Mechanical properties | | | |
| Hardness (JIS A) | 72 | 74 | 81 |
| Tensile strength (kgf/cm²) | 113 | 105 | 88 |
| Tensile elongation (%) | 224 | 268 | 106 |
| 50% tensile stress (kgf/cm²) | 17 | 22 | 39 |
| Compression set (100° C., 24 hours, %) | 41 | 16 | 12 |
| Plasma resistance | | | |
| Percentage of weight reduction (%/cm²) | 0.080 | 0.089 | 0.081 |

Example 29

The fluorine-containing multi-segment polymer obtained in Example 5, 2,2-bis(3-amino-4-hydroxyphenyl)

hexafluoropropane as a crosslinking agent and carbon black (Thermax N-990 available from Cancarb Co., Ltd.) as a filler were mixed in a weight ratio of 100/2/20 and kneaded with an open roll to give a crosslinkable molding composition.

The crosslinkable molding composition was put in a metal die and subjected to primary vulcanization under the conditions shown in Table 10. Then the primarily vulcanized article was subjected to two-step secondary vulcanization under the conditions shown in Table 10 to give a molded article. Physical properties of the molded article were measured in the same manner as in Example 25 (100% tensile stress was measured according to JIS K 6301). The results are shown in Table 10.

TABLE 10

|  | Ex. 29 |
|---|---|
| Polymer used | Ex. 5 |
| Primary vulcanization conditions | |
| Temperature (° C.) | 180 |
| Time (min) | 15 |
| Secondary vulcanization conditions | |
| First step | |
| Temperature (° C.) | 204 |
| Time (hr) | 18 |
| Secondary step | |
| Temperature (° C.) | 228 |
| Time (hr) | 18 |
| Mechanical properties | |
| Hardness (JIS A) | 86 |
| Tensile strength (kgf/ cm$^2$) | 81 |
| Tensile elongation (%) | 186 |
| 100% tensile stress (kgf/cm$^2$) | 77 |

Industrial Applicability

According to the present invention, it is possible to provide a molding material which is suitable particularly for molding of a sealing material for semiconductor-related production apparatuses and comprises a fluorine-containing multi-segment polymer being excellent in mechanical properties (particularly at high temperature), abrasion resistance and transparency and ensuring reduced contamination and reduced gas permeation while maintaining inherent characteristics of a fluorine-containing elastomer such as flexibility, elasticity, sealing property, chemical resistance and heat resistance.

What is claimed is:

1. A molding material comprising a solid fluorine-containing multi-segment polymer having an elastomeric fluorine-containing polymer chain segment and a non-elastomeric fluorine-containing polymer chain segment, in which said elastomeric fluorine-containing polymer chain segment imparts flexibility to the whole polymer and has perhaloolefin units as a recurring unit in an amount of not less than 95% by mole, said non-elastomeric fluorine-containing polymer chain segment consists essentially of 85 to 100% by mole of tetrafluoroethylene and 0 to 15% by mole of $CF_2=CF-R_f^1$, in which $R_f^1$ is $CF_3$ or $OR_f^2$, wherein $R_f^2$ is a perfluoroalkyl group having 1 to 5 carbon atoms, and in said fluorine-containing multi-segment polymer, A/(A+C) is equal to or larger than 65% by weight, provided that the elastomeric fluorine-containing polymer chain segment is represented by A, the non-elastomeric fluorine-containing polymer chain segment is represented by B, the fluorine-containing multi-segment polymer is represented by B-A-B or A-B and a polymer molecule consisting of the elastomeric fluorine-containing polymer chain segment A which is not bonded to the non-elastomeric fluorine-containing polymer chain segment B is represented by C.

2. The molding material of claim 1, wherein in said fluorine-containing multi-segment polymer, the elastomeric fluorine-containing polymer chain segment and/or the non-elastomeric fluorine-containing polymer chain segment have a recurring unit derived from monomer giving a curing site to the respective segments.

3. The molding material of claim 2, wherein an amount of said recurring unit derived from monomer giving a curing site is not more than 5% by mole based on each segment.

4. The molding material of claim 1, wherein A/(A+C) is equal to or larger than 90% by weight.

5. The molding material of claim 1, wherein in said fluorine-containing multi-segment polymer, the elastomeric fluorine-containing polymer chain segment is a non-crystalline segment and its glass transition temperature is not more than 25° C.

6. The molding material of claim 5, wherein the elastomeric fluorine-containing polymer chain segment comprises 45 to 90% by mole of tetrafluoroethylene, 10 to 50% by mole of perfluoro(alkyl vinyl ether) and 0 to 5% by mole of monomer giving a curing site.

7. The molding material of claim 1, wherein in said fluorine-containing multi-segment polymer, the non-elastomeric fluorine-containing polymer chain segment is a polymer chain having a crystalline melting point of not less than 150° C.

8. A crosslinkable molding composition comprising 100 parts by weight of the fluorine-containing multi-segment polymer of claim 1, 0.05 to 10 parts by weight of an organic peroxide and 0.1 to 10 parts by weight of crosslinking aid.

9. A molded article obtained by molding and crosslinking position of claim 8.

10. The molded article of claim 9, in the form of a seal.

11. The molded article of claim 10, for use in an apparatus for the production of semiconductors.

12. A sealing material for an apparatus for producing semiconductor which is obtained from the molding material of claim 1.

13. A molded article formed from the molding material of claim 1, in the form of a seal.

14. The molded article of claim 13, for use in an apparatus for the production of semiconductors.

15. A crosslinkable molding composition comprising 100 parts by weight of a fluorine-containing multi-segment polymer having a nitrile group as a curing site and 0.1 to 10 parts by weight of a crosslinking agent having a functional group capable of reacting with the nitrile group, wherein the fluorine-containing multi-segment polymer is a solid fluorine-containing multi-segment polymer having an elastomeric fluorine-containing polymer chain segment and a non-elastomeric fluorine-containing polymer chain segment, in which said elastomeric fluorine-containing polymer chain segment imparts flexibility to the whole polymer and has perhaloolefine units as a recurring unit in an amount of not less than 90% by mole.

* * * * *